US011453403B2

(12) United States Patent
Wang (10) Patent No.: US 11,453,403 B2
(45) Date of Patent: Sep. 27, 2022

(54) ABNORMAL DRIVING BEHAVIOR DETERMINATION METHOD, DEVICE, VEHICLE AND MEDIUM

(71) Applicant: BEIJING BAIDU NETCOM SCIENCE AND TECHNOLOGY CO., LTD., Beijing (CN)

(72) Inventor: Keyao Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/379,475

(22) Filed: Jul. 19, 2021

(65) Prior Publication Data

US 2021/0347366 A1    Nov. 11, 2021

(30) Foreign Application Priority Data

Nov. 4, 2020    (CN) .......................... 202011217097.3

(51) Int. Cl.
*B60W 40/09* (2012.01)
*G06V 20/59* (2022.01)
(Continued)

(52) U.S. Cl.
CPC ........... *B60W 40/09* (2013.01); *G06V 20/597* (2022.01); *G06V 40/107* (2022.01);
(Continued)

(58) Field of Classification Search
CPC ........... B60W 40/09; B60W 2540/223; B60W 2540/225; G06V 20/597; G06V 40/107; G06V 40/161; G06V 40/18
See application file for complete search history.

(56) References Cited

U.S. PATENT DOCUMENTS 10,712,816 B2 *   7/2020   Rao ..................... G06V 20/597
11,030,442 B1 *   6/2021   Bergamo ............. G06K 9/6271
(Continued)

FOREIGN PATENT DOCUMENTS

CN    111301280 A    *    6/2020

OTHER PUBLICATIONS

Mahdi et al., "Computer Vision for Driver Assistance" In: "Computer Vision for Driver Assistance", Jan. 1, 2017, Springer, pp. 21-24.
(Continued)

*Primary Examiner* — Mohamed Barakat
(74) *Attorney, Agent, or Firm* — KDB Firm PLLC (57) ABSTRACT

Provided are an abnormal driving behavior determination method and apparatus, a device, a vehicle and a medium, which relate to the field of artificial intelligence and, in particular, to the field of computer vision and in-depth learning. A specific implementation includes: determining multiple arm keypoints of an arm included in an original image of a driving user; determining an arm bending angle of the driving user according to the multiple arm keypoints; and determining whether the driving user has an abnormal driving behavior according to the arm bending angle. In the present application, the arm bending angle of the driving user is introduced for characterizing a driving pose of the driving user so that the abnormal driving behavior of the driving user is determined according to the arm bending angle, providing a new manner for determining the abnormal driving behavior.

18 Claims, 4 Drawing Sheets

(51) Int. Cl.
*G06V 40/18* (2022.01)
*G06V 40/10* (2022.01)
*G06V 40/16* (2022.01)

(52) U.S. Cl.
CPC ............ *G06V 40/161* (2022.01); *G06V 40/18* (2022.01); *B60W 2540/223* (2020.02); *B60W 2540/225* (2020.02)

(56) References Cited

U.S. PATENT DOCUMENTS

| | | | |
|---|---|---|---|
| 2006/0055358 A1* | 3/2006 | Ogawa | B25J 9/1674 318/568.24 |
| 2011/0249868 A1* | 10/2011 | Tsukizawa | A61B 5/163 382/103 |
| 2018/0173974 A1* | 6/2018 | Chang | G06T 5/20 |

OTHER PUBLICATIONS

Craye et al., "Driver Distraction detection and recognition using RGB-D sensor" ARXIV.org, Feb. 1, 2015, 11 pages.
European Search Report and Written Opinion for the European Patent Application No. 21187073, dated Jan. 19, 2022, 13 pages.

\* cited by examiner

ABNORMAL DRIVING BEHAVIOR DETERMINATION METHOD, DEVICE, VEHICLE AND MEDIUM

CROSS-REFERENCE TO RELATED APPLICATIONS

This application claims priority to Chinese patent application No. 202011217097.3 filed with the CNIPA on Nov. 4, 2020, the disclosure of which is incorporated herein by reference in its entirety.

TECHNICAL FIELD

The present application relates to the field of artificial intelligence, in particular, computer vision and in-depth learning technologies, and specifically, an abnormal driving behavior determination method, a device, a vehicle and a medium.

BACKGROUND

With the improvement of people's living standards, cars have entered thousands of households, and the driving safety of cars gradually becomes a problem of concern. When a user drives a vehicle, an abnormal driving behavior of the user often occurs, resulting in a safety accident. To reduce potential safety hazards in a driving process, it is crucial to detect and determine the abnormal driving behavior of the driving user.

However, in the related art, when the abnormal driving behavior of the driving user is determined, the result has relatively poor accuracy, which poses a threat to the life safety of the driving user and a passenger.

SUMMARY

The present application provides an abnormal driving behavior determination method and apparatus, a device, a vehicle and a medium, which provide a determination result with relatively high accuracy.

According to the present application, an abnormal driving behavior determination method is provided. The method includes steps described below.

Multiple arm keypoints in an original image of a driving user are determined.

An arm bending angle of the driving user is determined according to the multiple arm keypoints.

It is determined whether the driving user has an abnormal driving behavior according to the arm bending angle.

According to the present application, an abnormal driving behavior determination apparatus is further provided. The apparatus includes a keypoint determination module, an arm bending angle determination module and an abnormal driving behavior determination module.

The keypoint determination module is configured to determine multiple arm keypoints in an original image of a driving user.

The arm bending angle determination module is configured to determine an arm bending angle of the driving user according to the multiple arm keypoints.

The abnormal driving behavior determination module is configured to determine whether the driving user has an abnormal driving behavior according to the arm bending angle.

According to the present application, an electronic device is further provided. The electronic device includes at least one processor and a memory communicatively connected to the at least one processor.

The memory stores an instruction executable by the at least one processor, and the instruction is executed by the at least one processor to cause the at least one processor to perform the abnormal driving behavior determination method according to any embodiment of the present application.

According to the present application, a vehicle is further provided. The vehicle includes the electronic device according to any embodiment of the present application.

According to the present application, a non-transitory computer-readable storage medium is further provided. The non-transitory computer-readable storage medium stores a computer instruction for causing a computer to perform the abnormal driving behavior determination method according to any embodiment of the present application.

According to technical schemes of the present application, the accuracy of the determination result of the abnormal driving behavior is improved.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the present solution and not to limit the present application. In the drawings.

DETAILED DESCRIPTION

Example embodiments of the present application, including details of embodiments of the present application, are described hereinafter in conjunction with the drawings to facilitate understanding. The example embodiments are merely illustrative. Therefore, it will be appreciated by those having ordinary skill in the art that various changes and modifications may be made to the embodiments described herein without departing from the scope and spirit of the present application. Similarly, description of well-known functions and constructions is omitted hereinafter for clarity and conciseness.

Various abnormal driving behavior determination methods and an abnormal driving behavior determination apparatus provided by the present application are applicable to the case where an abnormal driving behavior of a driving user is detected or monitored online in a process of driving a movable apparatus. The various abnormal driving behavior determination methods involved in the present application may be executed by the abnormal driving behavior determination apparatus. The abnormal driving behavior determination apparatus may be implemented by software and/or hardware and is configured in an electronic device. The electronic device may be a terminal device or a built-in device carried in the movable apparatus.

The movable apparatus may be a vehicle, a ship or the like.

Figure 1:
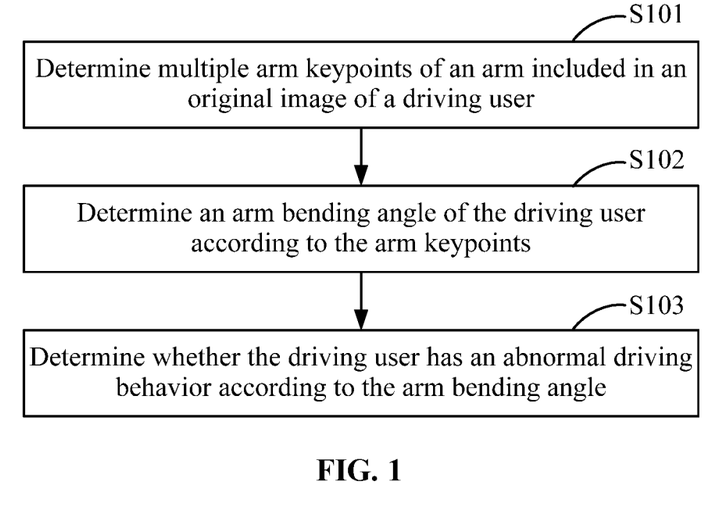
FIG. 1 is a flowchart of an abnormal driving behavior determination method according to an embodiment of the present application.

Referring to FIG. 1 which is a flowchart of an abnormal driving behavior determination method, the method includes steps described below.

In S101, multiple arm keypoints of an arm included in an original image of a driving user are determined.

The original image may be understood as an image including an arm of the driving user and collected when the driving user drives a movable apparatus.

An arm keypoint may be understood as a keypoint for characterizing a set-point position of an arm. The set-point position may be preset by a technician according to requirements or empirical values. Exemplarily, the set-point position may be a position where a joint is located. For example, the set-point position may include positions corresponding to a wrist joint, a finger joint, an elbow joint, a shoulder joint and the like. Exemplarily, the set-point position may also be a point position on an upper arm and a point position on a forearm, which are determined by a set number or a set interval according to a length of the upper arm of the arm and a length of the arm. The set number or the set interval may be determined by the technician according to requirements or empirical values. Of course, the set numbers or the set intervals used for the upper arm and the forearm may be set to the same value or different values.

The original image of the driving user may be pre-stored locally in an electronic device, pre-stored on a cloud or in another storage device associated with the electronic device. When the abnormal driving behavior determination needs to be performed, the original image of the driving user is acquired so that the arm keypoints are determined based on the acquired original image.

Alternatively, the original image of the driving user may be an image collected in real time or regularly by an image collection device disposed in the movable apparatus. The collected image is transmitted to the electronic device for determining the arm keypoints and then determining the abnormal driving behavior. An image collection frequency may be set by the technician according to requirements or empirical values or may be adjusted by the driving user.

In an alternative embodiment, a target arm in the original image of the driving user may be identified by a pre-trained arm recognition model, and curve fitting is performed on the target arm so that the multiple arm keypoints are obtained. The arm recognition model may be obtained in the manner that a pre-constructed first neural network model is trained by sample images with arm regions being pre-marked.

In another alternative embodiment, the multiple arm keypoints of the arm included in the original image of the driving user may also be extracted by a pre-trained keypoint extraction model. The keypoint extraction model may be obtained in the manner that a pre-constructed second neural network model is trained by sample images with arm keypoints at set-point positions being pre-marked. The first neural network model and the second neural network model may have the same structure or different structures, which is not limited in the embodiment of the present application.

It is to be noted that if the multiple arm keypoints of the arm included in the original image are obtained through direct processing on the original image, interference information of a region where a non-driving user is located in the original image has a certain impact on the determination result of keypoints, thereby affecting the accuracy of a determination result of an abnormal behavior of the driving user and increasing the amount of computing. To avoid the preceding case, in an alternative embodiment, the step in which the multiple arm keypoints of the arm included in the original image of the driving user are determined may include: recognizing a human face region in the original image of the driving user; expanding the human face region of the driving user to obtain a candidate region, where the candidate region includes an arm region; clipping the original image according to the candidate region to obtain a target image; and determining the multiple arm keypoints of the arm included in the target image.

Exemplarily, the human face region in the original image of the driving user may be recognized using a pre-trained human face recognition model; if one human face region is recognized, the one human face region is directly used as the human face region of the driving user; if at least two human face regions are recognized, the human face region of the driving user is determined from the recognized human face regions; the human face region of the driving user is expanded according to a set expansion rule so that the candidate region including the arm region of the driving user is obtained; the original image is clipped according to the candidate region so that the target image is obtained; the original image is replaced with the target image, and the multiple arm keypoints of the arm included in the target image are determined by the pre-trained keypoint extraction model.

It is to be understood that through the step in which the original image is clipped to obtain the target image and the original image is replaced with the target image for determining the arm keypoints can reduce the impact of interference information of the non-driving user on the determination result of the arm keypoints, reduce the amount of data computing in the process of determining the arm keypoints, and improve the accuracy of the determination result of the arm keypoints, thus laying a foundation for improving the accuracy of the determination result and the determination efficiency of the abnormal driving behavior.

In an embodiment, the step in which the human face region of the driving user is determined from the recognized human face regions may include: determining similarity between an image of each recognized human face region and an image of the driving user; and determining the human face region of the driving user from the recognized human face regions according to the similarity. The image of the driving user may be an image pre-collected before the driving user drives the movable apparatus. Generally, a human face region with the highest similarity is determined to be the human face region of the driving user.

The data computing amount may be increased when the preceding manner for determining the human face region of the driving user is used. To avoid a decrease in the determination efficiency of the abnormal driving behavior due to the input of computing amount, in an embodiment, the step in which the human face region of the driving user is determined from the recognized human face regions may also include determining the driving user according to a position relationship of recognition results of the human face regions in the original image.

Limited by different positions of the driving user in different movable apparatuses, to improve the universality of the manner for determining the human face region of the driving user while reducing the amount of data computing, in an embodiment, the step in which the human face region of the driving user is determined from the recognized human face regions may also include determining a larger human face region of the human face regions to be the human face region of the driving user. Typically, a human face region with the largest area is selected as the human face region of the driving user.

It is to be noted that since the image collection device is generally closer to the driving user when installed, the human face region of the driving user in the original image generally has a larger area than a human face region of the non-driving user. Therefore, the human face region of the driving user may be distinguished from the human face region of the non-driving user by the size of the human face region.

Exemplarily, the step in which the human face region of the driving user is expanded according to the set expansion rule so that the candidate region including the arm region of the driving user is obtained may include: for a human face detection frame corresponding to the human face region of the driving user, expanding the human face detection frame by a first set multiple in an extension direction of an upper frame, and expanding the human face detection frame by a second set multiple along a middle axis of the upper frame and towards an underjaw direction; and using a region corresponding to the expanded human face detection frame as the candidate region. The candidate region includes the arm region. The first set multiple and the second set multiple may be determined by the technician according to requirements or empirical values or repeatedly determined by a large number of trails. The first set multiple may be the same as or different from the second set multiple. Of course, in the embodiment of the present application, the human face region of the driving user may be expanded in other manners, which is not limited in the embodiment of the present application.

In S102, an arm bending angle of the driving user is determined according to the arm keypoints.

The arm bending angle is used for characterizing a size of an angle between the upper arm and the forearm of the arm, with an elbow as a vertex.

Exemplarily, an upper arm segment and a forearm segment may be constructed based on the arm keypoints; and an angle between the upper arm segment and the forearm segment is used as the arm bending angle. Generally, the arm moves within a range of (0°, 180°] with the elbow as the vertex.

The upper arm segment may be obtained in a manner that line fitting is performed on arm keypoints of the upper arm or a line is constructed for at least two arm keypoints on the upper arm.

The forearm segment may be obtained in a manner that line fitting is performed on arm keypoints of the forearm or a line is constructed for at least two arm keypoints on the forearm.

In S103, it is determined whether the driving user has the abnormal driving behavior according to the arm bending angle.

It is to be noted that when the driving user is in a normal driving state, hands of the driving user should be located in a steering-wheel region of the movable apparatus. In this case, a value of the arm bending angle formed by the upper arm and the forearm of the driving user should be an angle value greater than a certain set angle threshold. When the driving user is in an abnormal driving situation where a hand is required such as making a phone call or eating foods, the hand of the driving user is closer to a shoulder. In this case, the value of the arm bending angle formed by the upper arm and the forearm of the driving user should be an angle value that is not greater than a first set angle threshold.

Exemplarily, the step in which it is determined whether the driving user has the abnormal driving behavior according to the arm bending angle may include: comparing the arm bending angle with a set angle threshold; if the arm bending angle is not greater than the set angle threshold, it indicates that the arm of the driving user is not located on the steering wheel of the movable apparatus due to an operation such as making a phone call or eating foods, and thus it is determined that the driving user has the abnormal driving behavior; if the arm bending angle is greater than the set angle threshold, it indicates that the arm of the driving user is located on the steering wheel of the movable apparatus, and thus it is determined that the driving user has no abnormal driving behavior. The set angle threshold may be determined by the technician according to requirements or empirical values, may be repeatedly determined by a large number of trails, or may be adjusted according to driving habits of the driving user.

In the embodiment of the present application, the arm bending angle of the driving user is introduced for characterizing a driving pose of the driving user so that the abnormal driving behavior of the driving user is determined according to the arm bending angle, providing a new manner for determining the abnormal driving behavior. Compared with the related art where an abnormal driving behavior is determined by a pose angle of the face of the driving user, the accuracy of the determination result of the abnormal driving behavior with hand participation is improved.

In another alternative embodiment of the present application, the arm keypoints are refined as follows: "the arm keypoints include a hand keypoint, a shoulder keypoint and an elbow keypoint"; and the operation for determining the arm bending angle is refined as follows: "determining the forearm segment between the hand keypoint and the elbow keypoint and the upper arm segment between the elbow keypoint and the shoulder keypoint; and using the angle between the forearm segment and the upper arm segment as the arm bending angle", so as to optimize the mechanism for determining the arm bending angle.

Figure 2:
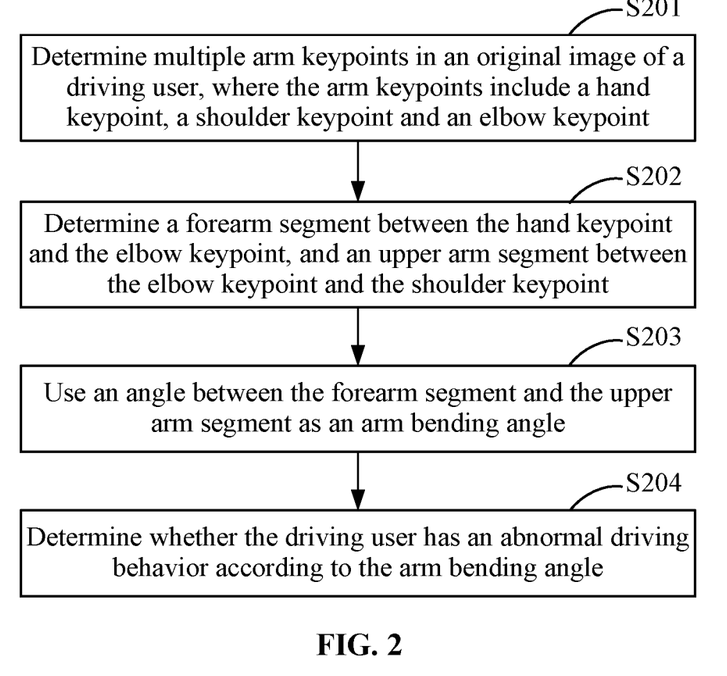
FIG. 2 is a flowchart of another abnormal driving behavior determination method according to an embodiment of the present application.

Referring to FIG. 2, an abnormal driving behavior determination method includes steps described below.

In S201, multiple arm keypoints of an arm included in an original image of a driving user are determined, where the arm keypoints include a hand keypoint, a shoulder keypoint and an elbow keypoint.

When multiple arms are included in the original image, a group of arm keypoints corresponding to each arm is determined for the each arm. The arm keypoints include the hand keypoint, the shoulder keypoint and the elbow keypoint.

It is to be noted that when a complete group of hand keypoints, shoulder keypoints and elbow keypoints cannot be acquired at the same time from the arm keypoints in the original image of the driving user, it indicates that an image collection device of the original image is installed at an abnormal position, and the driving user may be reminded by sound, light, vibration or voice.

The hand keypoint may be a position point in any region of a palm or wrist and used for characterizing a position of a hand. The elbow keypoint may be a position point in any region of an elbow and used for characterizing a position of the elbow. The shoulder keypoint may be a position point in any region of a shoulder and used for characterizing a position of the shoulder.

In S202, a forearm segment between the hand keypoint and the elbow keypoint and an upper arm segment between the elbow keypoint and the shoulder keypoint are determined.

Exemplarily, for each arm in the original image, the hand keypoint and the elbow keypoint may be directly connected so that the forearm segment is obtained, and the elbow keypoint and the shoulder keypoint may be directly connected so that the upper arm segment is obtained.

It is to be noted that when the original image includes at least two human face images, it indicates that arms in the original image may include an arm of a non-driving user. Therefore, an arm bending angle may be determined with an error if it is directly determined through the determined arm keypoints, which affects the accuracy of a recognition result of the abnormal driving behavior. To avoid an impact of arm keypoints of an arm of the non-driving user on the determination result of the abnormal driving behavior, in an alternative embodiment, abnormal keypoints of the non-driving user may be removed from the multiple arm keypoints.

In an alternative embodiment, the step in which the abnormal keypoints of the non-driving user are removed from the multiple arm keypoints may include: determining the abnormal keypoints of the non-driving user according to a length of the forearm segment and/or the upper arm segment associated with each arm; and removing the abnormal keypoints from the multiple arm keypoints.

Generally, when the original image includes a human face image of the driving user and a human face image of the non-driving user, the human face image of the driving user has a larger area than the human face image of the non-driving user; accordingly, an arm of the driving user is longer than an arm of the non-driving user. Accordingly, a forearm segment of the driving user is longer than a forearm segment of the non-driving user, and an upper arm segment of the driving user is longer than an upper arm segment of the non-driving user. Therefore, the abnormal keypoints of the non-driving user may be recognized by the length of the forearm segment and/or the upper arm segment associated with each arm, and the abnormal keypoints of the non-driving user may be removed from the arm keypoints.

Lengths of forearm segments in the original image are compared, and/or, lengths of upper arm segments in the original image are compared; an arm corresponding to a shorter forearm segment and/or an arm corresponding to a shorter upper arm segment are used as the arm of the non-driving user; and arm keypoints associated with the arm of the non-driving user are used as the abnormal keypoints.

In another alternative embodiment, the step in which the abnormal keypoints of the non-driving user are removed from the multiple arm keypoints may include: determining the abnormal keypoints of the non-driving user according to a distance between arm keypoints of each arm and the human face image of the driving user; and removing the abnormal keypoints from the multiple arm keypoints.

Generally, when the original image includes the human face image of the driving user and a human face image of the non-driving user, arm keypoints of the driving user are closer to the human face image of the driving user, and arm keypoints of the non-driving user are closer to the human face image of the non-driving user. Therefore, an arm with a longer distance may be determined to be the arm of the non-driving user according to the distance between arm keypoints of each arm and the human face image of the driving user. Accordingly, the arm keypoints of the arm of the non-driving user are used as the abnormal keypoints of the non-driving user, and the abnormal keypoints of the non-driving user are removed from the arm keypoints.

In S203, an angle between the forearm segment and the upper arm segment is used as the arm bending angle.

With a position of the elbow keypoint as a vertex, the angle between the forearm segment and the upper arm segment is used as the arm bending angle.

In S204, it is determined whether the driving user has the abnormal driving behavior according to the arm bending angle.

If the arm bending angle is greater than a set angle threshold, it is determined that the driving user has no abnormal driving behavior. If the arm bending angle is not greater than the set angle threshold, it is determined that the driving user has the abnormal driving behavior. The set angle threshold may be determined by a technician according to requirements or empirical values or repeatedly determined by a large number of trials.

In the embodiment of the present application, the arm keypoints are refined into the hand keypoint, the shoulder keypoint and the elbow keypoint; and the operation for determining the arm bending angle is refined as follows: determining the forearm segment between the hand keypoint and the elbow keypoint and the upper arm segment between the elbow keypoint and the shoulder keypoint; and using the angle between the forearm segment and the upper arm segment as the arm bending angle. Using the preceding technical scheme, the mechanism for determining the arm bending angle is improved, at the same time, the arm keypoints are refined into three keypoints with corresponding meanings, reducing an increase of the amount of data computing due to the determination of irrelevant keypoints and laying a foundation for the improvement of the determination efficiency of the abnormal driving behavior. Meanwhile, the upper arm segment and the forearm segment are determined so that the accuracy of the determined arm bending angle is ensured, thereby laying a foundation for the improvement of the accuracy of the determination result of the abnormal driving behavior.

It is to be noted that the abnormal driving behavior of the driving user when a hand leaves a steering wheel, such as making a phone call or eating foods, can be effectively recognized by the arm bending angle. However, driving with a head lowered when the driving user makes fun with a phone or driving with fatigue fails to be recognized only in the preceding manner.

To further reduce a failure to recognize the abnormal driving behavior, in another alternative embodiment of the present application, a line-of-sight angle of the driving user may be introduced so that the abnormal driving behavior is determined according to the line-of-sight angle, thereby reducing the failure to recognize cases such as driving with a head lowered when the driving user makes fun with a phone or driving with fatigue.

Figure 3:
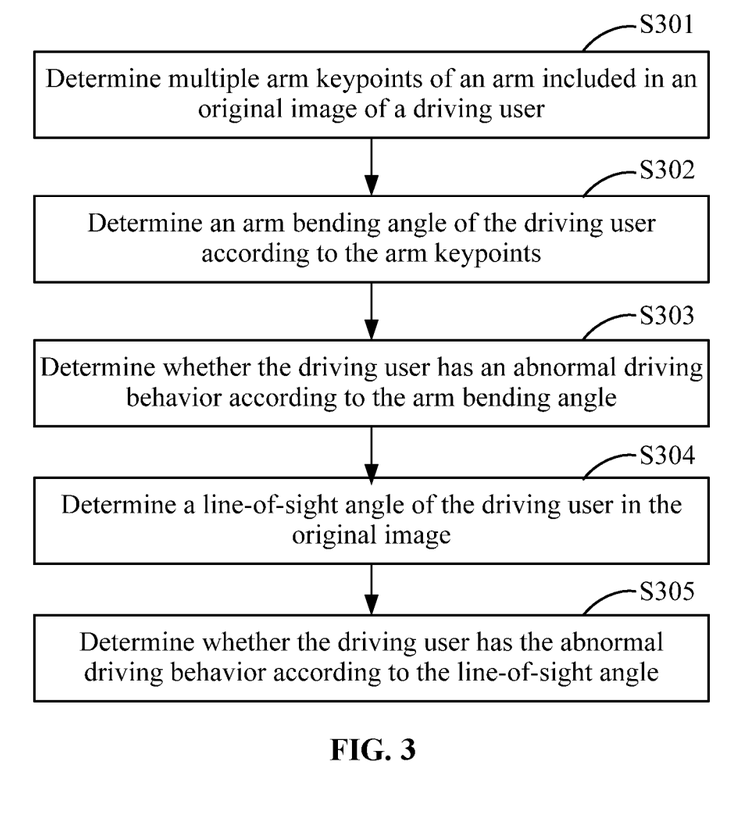
FIG. 3 is a flowchart of another abnormal driving behavior determination method according to an embodiment of the present application.

Referring to FIG. 3, an abnormal driving behavior determination method includes steps described below.

In S301, multiple arm keypoints of an arm included in an original image of a driving user are determined.

In S302, an arm bending angle of the driving user is determined according to the arm keypoints.

In S303, it is determined whether the driving user has an abnormal driving behavior according to the arm bending angle.

In S304, a line-of-sight angle of the driving user in the original image is determined.

The line-of-sight angle is used for characterizing a gaze position of the driving user.

In an alternative embodiment, the step in which the line-of-sight angle of the driving user in the original image is determined may include: inputting the original image into a pre-trained gaze position determination model to obtain the gaze position of the driving user in the original image; and determining the line-of-sight angle of the driving user according to the gaze position. The gaze position determination model may be obtained in the manner that a pre-constructed third neural network model is trained by a large number of sample images with gaze positions of sample driving users being marked. A model structure of the third neural network model may be the same as or different from a network structure of the preceding first neural network model or second neural network model.

In another alternative embodiment, the step in which the line-of-sight angle of the driving user in the original image is determined may include: determining a pupil category of the driving user in the original image, where the pupil category includes at least one of a left part of an eye, a right part of an eye, an upper part of an eye, a lower part of an eye, a middle part of an eye or a closed eye; and determining the line-of-sight angle of the driving user according to the pupil category.

Exemplarily, a pupil position of the driving user in the original image may be determined directly according to a pupil position recognition model; and the pupil category is determined according to the pupil position and an eye region of the driving user. The pupil position recognition model may be obtained in a manner that a pre-constructed first machine learning model is trained using a large number of sample images with eye regions and pupil positions of sample driving users being marked.

Exemplarily, to simplify the mechanism for determining the pupil category, the original image may be directly processed according to a pupil category discrimination model, and the pupil category of the driving user in the original image may be outputted. The pupil category discrimination model may be obtained in the manner that a pre-constructed second machine learning model is trained using a large number of sample images with eye regions and pupil categories of sample driving users being marked. The first machine learning model and the second machine learning model may have the same network structure or different network structures.

Exemplarily, the step of determining the line-of-sight angle of the driving user according to the pupil category may include: determining a line-of-sight angle of the currently determined pupil category according to a pre-constructed correspondence between pupil categories and line-of-sight angles. The correspondence between pupil categories and line-of-sight angles may be repeatedly determined by a large number of trials. A line-of-sight angle corresponding to the closed eye is 0, and line-of-sight angles corresponding to other categories are not 0. A line-of-sight angle corresponding to the lower part of the eye has a smaller value than those corresponding to other categories with non-zero angles.

In S305, it is determined whether the driving user has an abnormal driving behavior according to the line-of-sight angle.

If the line-of-sight angle is smaller than a set viewing angle threshold, it indicates that the driving user is in an abnormal driving case such as making fun with a phone with a head lowered, or driving with fatigue, e.g., closing eyes, and thus it is determined that the driving user has the abnormal driving behavior. If the line-of-sight angle is not smaller than the set viewing angle threshold, it indicates that the driving user has no abnormal driving behavior such as closing eyes or making fun with the phone with the head lowered. The set viewing angle threshold may be determined by a technician according to requirements or empirical values or repeatedly determined by a large number of trials.

In the embodiment of the present application, the abnormal driving behavior such as driving with a head lowered or driving with closed eyes is recognized by the line-of-sight angle, which enriches the determination categories of the abnormal driving behavior, reduces the failure to recognize the abnormal driving behavior, and further improves the accuracy of the determination result of the abnormal driving behavior.

Based on the preceding technical schemes, the present application further provides an exemplary embodiment in which an abnormal driving behavior of a driving user in a vehicle is recognized.

Figure 4:
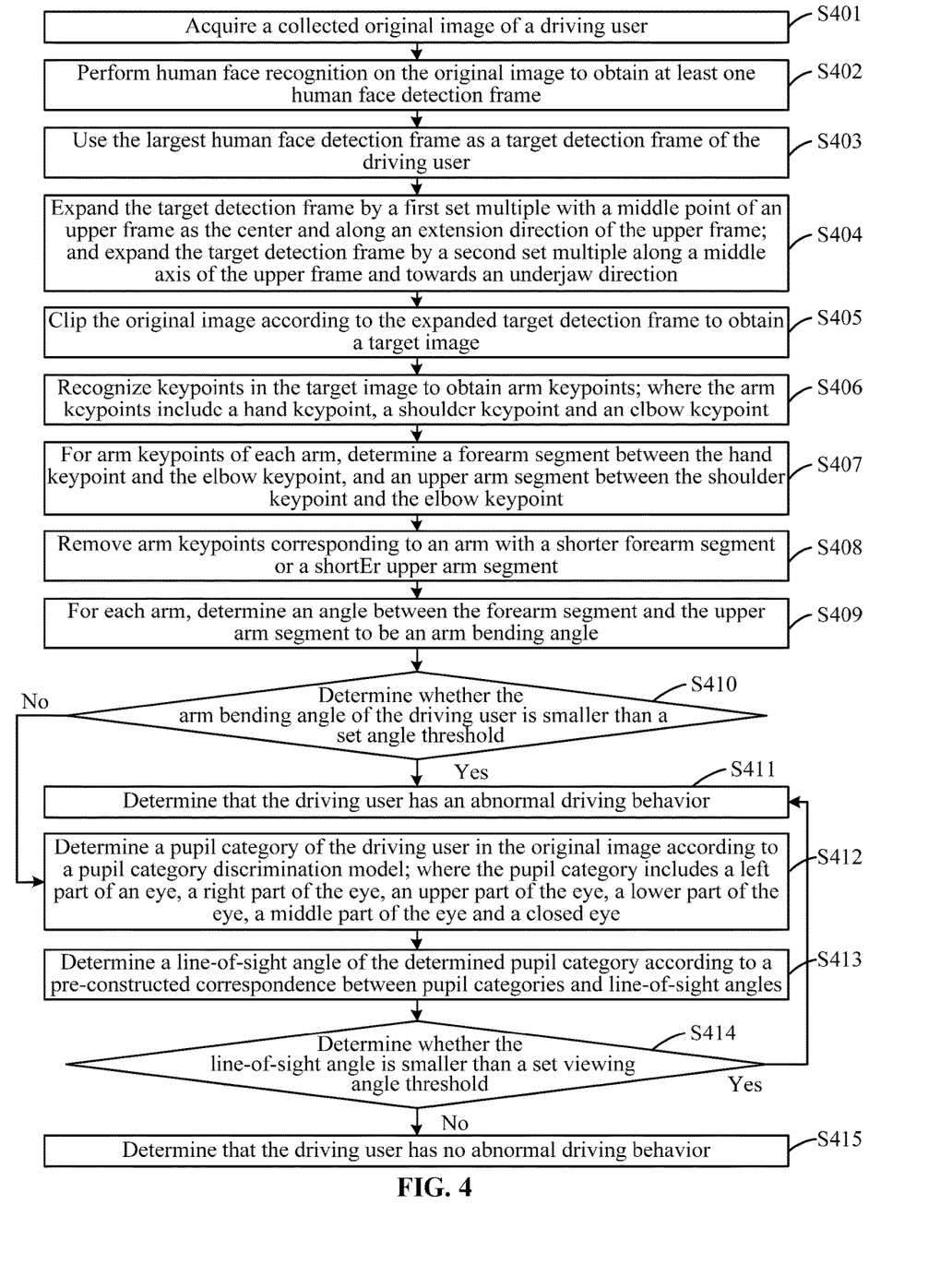
FIG. 4 is a flowchart of another abnormal driving behavior determination method according to an embodiment of the present application.

Referring to FIG. 4, an abnormal driving behavior determination method includes steps described below.

In S401, a collected original image of a driving user is acquired.

In S402, human face recognition is performed on the original image so that at least one human face detection frame is obtained.

In S403, the largest human face detection frame is used as a target detection frame of the driving user.

In S404, the target detection frame is expanded by a first set multiple with a middle point of an upper frame as the center and along an extension direction of the upper frame; and the target detection frame is expanded by a second set multiple along a middle axis of the upper frame and towards an underjaw direction.

The first set multiple may be the same as or different from the second set multiple.

In S405, the original image is clipped according to the expanded target detection frame so that a target image is obtained.

In S406, keypoints in the target image are recognized so that arm keypoints are obtained; where the arm keypoints include a hand keypoint, a shoulder keypoint and an elbow keypoint.

In S407, for arm keypoints of each arm, a forearm segment between the hand keypoint and the elbow keypoint and an upper arm segment between the shoulder keypoint and the elbow keypoint are determined.

In S408, arm keypoints corresponding to an arm with a shorter forearm segment or a shorter upper arm segment are removed.

It is to be noted that after the arm with the shorter forearm segment or the shorter upper arm segment is removed, the remaining arm keypoints are arm keypoints corresponding to a left arm and/or a right arm of the driving user.

In S409, for each arm, an angle between the forearm segment and the upper arm segment is determined to be an arm bending angle.

In S410, it is determined whether the arm bending angle of the driving user is smaller than a set angle threshold. If so, S411 is performed. Otherwise, S412 is performed.

The set angle threshold may be set by a technician according to requirements or empirical values or may be adjusted by the driving user according to requirements.

In S411, it is determined that the driving user has an abnormal driving behavior.

In S412, a pupil category of the driving user in the original image is determined according to a pupil category discrimination model; where the pupil category includes a left part of an eye, a right part of the eye, an upper part of the eye, a lower part of the eye, a middle part of the eye and a closed eye.

In S413, a line-of-sight angle of the determined pupil category is determined according to a pre-constructed correspondence between pupil categories and line-of-sight angles.

In S414, it is determined whether the line-of-sight angle is smaller than a set viewing angle threshold. If so, S411 is performed. Otherwise, S415 is performed.

The set viewing angle threshold may be set by the technician according to requirements or empirical values.

In S415, it is determined that the driving user has no abnormal driving behavior.

As implementations of the preceding various abnormal driving behavior determination methods, the present application further provides an embodiment of a virtual apparatus for implementing the abnormal driving behavior determination methods.

Figure 5:
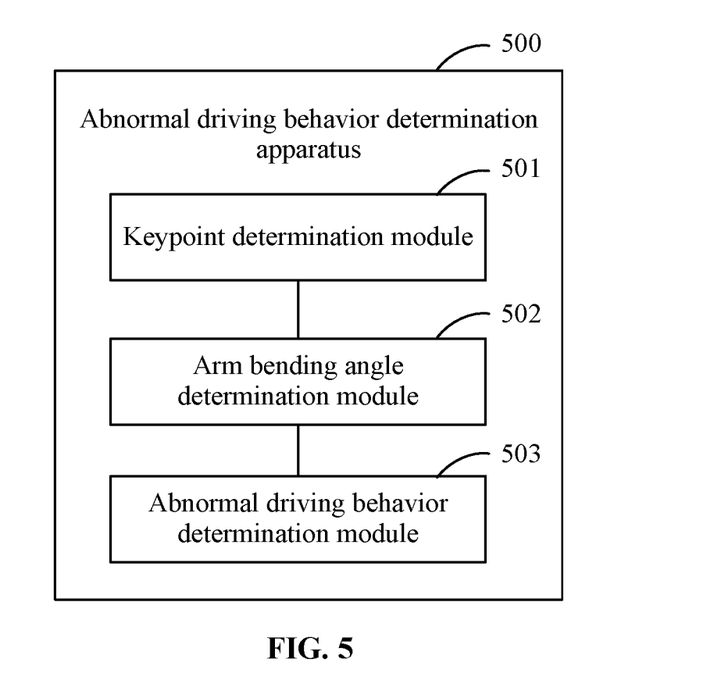
FIG. 5 is a structure diagram of an abnormal driving behavior determination apparatus according to an embodiment of the present application.

Referring to FIG. 5, an abnormal driving behavior determination apparatus 500 includes a keypoint determination module 501, an arm bending angle determination module 502 and an abnormal driving behavior determination module 503.

The keypoint determination module 501 is configured to determine multiple arm keypoints of an arm included in an original image of a driving user.

The arm bending angle determination module 502 is configured to determine an arm bending angle of the driving user according to the multiple arm keypoints.

The abnormal driving behavior determination module 503 is configured to determine whether the driving user has an abnormal driving behavior according to the arm bending angle.

In the embodiment of the present application, the arm bending angle of the driving user is introduced for characterizing a driving pose of the driving user so that the abnormal driving behavior of the driving user is determined according to the arm bending angle, providing a new manner for determining the abnormal driving behavior. Compared with the related art where an abnormal driving behavior is determined by a pose angle of the face of the driving user, the accuracy of the determination result of the abnormal driving behavior with hand participation is improved.

Further, the arm keypoints include a hand keypoint, a shoulder keypoint and an elbow keypoint.

The arm bending angle determination module 502 includes a segment determination unit and an arm bending angle determination unit.

The segment determination unit is configured to determine a forearm segment between the hand keypoint and the elbow keypoint and an upper arm segment between the elbow keypoint and the shoulder keypoint.

The arm bending angle determination unit is configured to use an angle between the forearm segment and the upper arm segment as the arm bending angle.

Moreover, if the original image includes at least two human face images, the apparatus further includes an abnormal keypoint removal module.

The abnormal keypoint removal module is configured to remove abnormal keypoints of a non-driving user from the multiple arm keypoints.

Further, the abnormal keypoint removal module includes a first abnormal keypoint determination unit and a first abnormal keypoint removal unit.

The first abnormal keypoint determination unit is configured to determine the abnormal keypoints of the non-driving user according to a length of the forearm segment and/or the upper arm segment associated with each arm.

The first abnormal keypoint removal unit is configured to remove the abnormal keypoints from the multiple arm keypoints.

Further, the abnormal keypoint removal module includes a second abnormal keypoint determination unit and a second abnormal keypoint removal unit.

The second abnormal keypoint determination unit is configured to determine the abnormal keypoints of the non-driving user according to a distance between arm keypoints of each arm and a human face image of the driving user.

The second abnormal keypoint removal unit is configured to remove the abnormal keypoints from the multiple arm keypoints.

Furthermore, the keypoint determination module 501 includes a human face region recognition unit, a candidate region obtaining unit, a target image obtaining unit and an arm keypoint determination unit.

The human face region recognition unit is configured to recognize a human face region in the original image of the driving user.

The candidate region obtaining unit is configured to expand the human face region of the driving user to obtain a candidate region, where the candidate region includes an arm region.

The target image obtaining unit is configured to clip the original image according to the candidate region to obtain a target image.

The arm keypoint determination unit is configured to determine the multiple arm keypoints of the arm included in the target image.

Further, in response to recognizing at least two human face regions in the original image, the keypoint determination module 501 further includes a driving user human face region determination unit.

The driving user human face region determination unit is configured to determine a larger human face region of the at least two human face regions to be the human face region of the driving user.

Further, the apparatus further includes a line-of-sight angle determination module.

The line-of-sight angle determination module is configured to determine a line-of-sight angle of the driving user in the original image.

The abnormal driving behavior determination module is configured to determine whether the driving user has the abnormal driving behavior according to the line-of-sight angle.

Further, the line-of-sight angle determination module includes a pupil category determination unit and a line-of-sight angle determination unit.

The pupil category determination unit is configured to determine a pupil category of the driving user in the original image, where the pupil category includes at least one of a left part of an eye, a right part of an eye, an upper part of an eye, a lower part of an eye, a middle part of an eye or a closed eye.

The line-of-sight angle determination unit is configured to determine the line-of-sight angle of the driving user according to the pupil category.

The preceding abnormal driving behavior determination apparatus may perform the abnormal driving behavior determination method according to any embodiment of the present disclosure and has function modules and beneficial effects corresponding to the execution of the abnormal driving behavior determination method.

According to embodiments of the present application, the present application further provides an electronic device and a readable storage medium.

Figure 6:
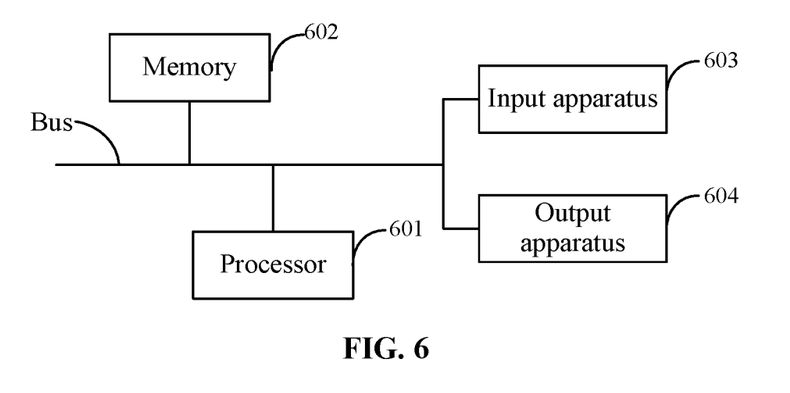
FIG. 6 is a block diagram of an electronic device for implementing an abnormal driving behavior determination method according to an embodiment of the present application.

FIG. 6 is a block diagram of an electronic device for implementing an abnormal driving behavior determination method according to an embodiment of the present application. The electronic device is intended to represent various forms of digital computers, for example, a laptop computer, a desktop computer, a worktable, a personal digital assistant, a server, a blade server, a mainframe computer and other applicable computers. The electronic device may further represent various forms of mobile apparatuses, for example, a personal digital assistant, a cellphone, a smartphone, a wearable device and other similar computing apparatuses. Herein the shown components, the connections and relationships between these components, and the functions of these components are illustrative only and are not intended to limit the implementation of the present application as described and/or claimed herein.

As shown in FIG. 6, the electronic device includes one or more processors 601, a memory 602 and interfaces for connecting various components, including a high-speed interface and a low-speed interface. The various components are interconnected to one another by different buses and may be mounted on a common mainboard or in other manners as desired. The processor may process instructions executed in the electronic device, including instructions stored in or on the memory to make graphic information of a graphical user interface (GUI) displayed on an external input/output apparatus (for example, a display device coupled to an interface). In other embodiments, if required, multiple processors and/ or multiple buses may be used with multiple memories. Similarly, multiple electronic devices may be connected, each providing some necessary operations (and, for example, serving as a server array, a set of blade servers, or a multi-processor system). FIG. 6 shows one processor 601 by way of example.

The memory 602 is the non-transitory computer-readable storage medium provided in the present application. The memory stores instructions executable by at least one processor to cause the at least one processor to perform the abnormal driving behavior determination method provided in the present application. The non-transitory computer-readable storage medium of the present application stores computer instructions for causing a computer to perform the abnormal driving behavior determination method provided in the present application.

The memory 602 as a non-transitory computer-readable storage medium is configured to store a non-transitory software program, a non-transitory computer-executable program and modules, for example, program instructions/ modules corresponding to the abnormal driving behavior determination methods provided in embodiments of the present application (i.e., the keypoint determination module 501, the arm bending angle determination module 502 and the abnormal driving behavior determination module 503 shown in FIG. 5). The processor 601 executes the non-transitory software program, instruction and modules stored in the memory 602 to execute various function applications and data processing of a server, that is, implement the abnormal driving behavior determination methods in the preceding method embodiments.

The memory 602 may include a program storage region and a data storage region. The program storage region may store an operating system and an application program required by at least one function. The data storage region may store data created based on the use of the electronic device for performing the abnormal driving behavior determination method. Additionally, the memory 602 may include a high-speed random-access memory and a non-transient memory, for example, at least one disk memory, a flash memory or another non-transient solid-state memory. In some embodiments, the memory 602 optionally includes memories disposed remote from the processor 601, and these remote memories may be connected, through a network, to the electronic device for performing the abnormal driving behavior determination method. Examples of the preceding network include, but are not limited to, the Internet, an intranet, a local area network, a mobile communication network and a combination thereof.

The electronic device for performing the abnormal driving behavior determination method may further include an input apparatus 603 and an output apparatus 604. The processor 601, the memory 602, the input apparatus 603 and the output apparatus 604 may be connected by a bus or in other manners. FIG. 6 uses connection by a bus as an example.

The input apparatus 603 may receive input number or character information and generate key signal input related to user settings and function control of the electronic device for performing the abnormal driving behavior determination method. The input apparatus 603 may be, for example, a touchscreen, a keypad, a mouse, a trackpad, a touchpad, a pointing stick, one or more mouse buttons, a trackball or a joystick. The output device 604 may be, for example, a display device, an auxiliary lighting device (for example, an LED) or a haptic feedback device (for example, a vibration motor). The display device may include, but is not limited to, a liquid-crystal display (LCD), a light-emitting diode (LED) display and a plasma display. In some embodiments, the display device may be a touchscreen.

Various embodiments of the systems and techniques described herein may be implemented in digital electronic circuitry, integrated circuitry, an application-specific integrated circuit (ASIC), computer hardware, firmware, software and/or a combination thereof. The various embodiments may include implementations in one or more computer programs. The one or more computer programs are executable and/or interpretable on a programmable system including at least one programmable processor. The programmable processor may be a dedicated or general-purpose programmable processor for receiving data and instructions from a memory system, at least one input apparatus and at least one output apparatus and transmitting the data and instructions to the memory system, the at least one input apparatus and the at least one output apparatus.

These computing programs (also referred to as programs, software, software applications or codes) include machine instructions of a programmable processor. These computing programs may be implemented in a high-level procedural and/or object-oriented programming language and/or in an assembly/machine language. As used herein, the term "machine-readable medium" or "computer-readable medium" refers to any computer program product, device and/or apparatus (for example, a magnetic disk, an optical disk, a memory or a programmable logic device (PLD)) for providing machine instructions and/or data for a programmable processor, including a machine-readable medium for receiving machine instructions as machine-readable signals. The term "machine-readable signal" refers to any signal used in providing machine instructions and/or data for a programmable processor.

In order that interaction with a user is provided, the systems and techniques described herein may be implemented on a computer. The computer has a display device (for example, a cathode-ray tube (CRT) or a liquid-crystal display (LCD) monitor) for displaying information to the user and a keyboard and a pointing device (for example, a mouse or a trackball) through which the user can provide input to the computer. Other types of devices may also be used for providing interaction with a user. For example, feedback provided for the user may be sensory feedback in any form (for example, visual feedback, auditory feedback or haptic feedback). Moreover, input from the user may be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein) or a computing system including any combination of such back-end, middleware or front-end components. Components of a system may be interconnected by any form or medium of digital data communication (for example, a communication network). Examples of the communication network include a local area network (LAN), a wide area network (WAN), the Internet and a blockchain network.

The computing system may include clients and servers. A client and a server are generally remote from each other and typically interact through a communication network. The relationship between the client and the server arises by virtue of computer programs running on respective computers and having a client-server relationship to each other. The server may be a cloud server, also referred to as a cloud computing server or a cloud host, which is a host product in a cloud computing service system, so as to solve the defects of difficult management and weak traffic scalability in traditional physical hosts and VPS services.

According to technical schemes in embodiments of the present application, an arm bending angle of a driving user is introduced for characterizing a driving pose of the driving user so that an abnormal driving behavior of the driving user is determined according to the arm bending angle, providing a new manner for determining the abnormal driving behavior. Compared with the related art where an abnormal driving behavior is determined by a pose angle of a face of a driving user, the accuracy of the determination result of the abnormal driving behavior with hand participation is improved.

Embodiments of the present application further provide a vehicle, and the vehicle is provided with the electronic device shown in FIG. 6.

It is to be understood that various forms of the preceding flows may be used, with steps reordered, added or removed. For example, the steps described in the present application may be executed in parallel, in sequence or in a different order as long as the desired results of the technical schemes disclosed in the present application are achieved. The execution sequence of these steps is not limited herein.

The scope of the present application is not limited to the preceding embodiments. It is to be understood by those skilled in the art that various modifications, combinations, subcombinations and substitutions may be made depending on design requirements and other factors. Any modifications, equivalent substitutions, improvements and the like made within the spirit and principle of the present application are within the scope of the present application.

What is claimed is:

1. An abnormal driving behavior determination method, comprising:
   determining a plurality of arm keypoints of an arm contained in an original image of a driving user;
   determining an arm bending angle of the driving user according to the plurality of arm keypoints; and
   determining whether the driving user has an abnormal driving behavior according to the arm bending angle;
   wherein determining the plurality of arm keypoints of the arm contained in the original image of the driving user comprises:
     recognizing a human face region in the original image of the driving user;
     expanding the human face region of the driving user to obtain a candidate region, wherein the candidate region comprises an arm region;
     clipping the original image according to the candidate region to obtain a target image; and
     determining the plurality of arm keypoints of the arm contained in the target image.

2. The method of claim 1, wherein the plurality of arm keypoints comprise a hand keypoint, a shoulder keypoint and an elbow keypoint; and
   wherein determining the arm bending angle of the driving user according to the plurality of arm keypoints comprises:
     determining a forearm segment between the hand keypoint and the elbow keypoint and an upper arm segment between the elbow keypoint and the shoulder keypoint; and
     using an angle between the forearm segment and the upper arm segment as the arm bending angle.

3. The method of claim 2, wherein in response to the original image comprising at least two human face images, the method further comprises:
   removing abnormal keypoints of a non-driving user from the plurality of arm keypoints.

4. The method of claim 3, wherein removing the abnormal keypoints of the non-driving user from the plurality of arm keypoints comprises:
   determining the abnormal keypoints of the non-driving user according to a length of at least one of the forearm segment or the upper arm segment associated with each arm; and
   removing the abnormal keypoints from the plurality of arm keypoints.

5. The method of claim 3, wherein removing the abnormal keypoints of the non-driving user from the plurality of arm keypoints comprises:
   determining the abnormal keypoints of the non-driving user according to a distance between arm keypoints of each arm and a human face image of the driving user; and
   removing the abnormal keypoints from the plurality of arm keypoints.

6. The method of claim 1, wherein in response to recognizing at least two human face regions in the original image,
determining, a larger human face region of the at least two human face regions to be the human face region of the driving user.

7. The method of claim 1, further comprising:
determining a line-of-sight angle of the driving user in the original image; and
determining whether the driving user has the abnormal driving behavior according to the line-of-sight angle.

8. The method of claim 7, wherein determining the line-of-sight angle of the driving user in the original image comprises:
determining a pupil category of the driving user in the original image, wherein the pupil category comprises at least one of a left part of an eye, a right part of an eye, an upper part of an eye, a lower part of an eye, a middle part of an eye or a closed eye; and
determining the line-of-sight angle of the driving user according to the pupil category.

9. An electronic device, comprising:
at least one processor; and
a memory communicatively connected to the at least one processor;
wherein the memory stores an instruction executable by the at least one processor, and the instruction is executed by the at least one processor to cause the at least one processor to perform the following steps:
determining a plurality of arm keypoints of an arm contained in an original image of a driving user;
determining an arm bending angle of the driving user according to the plurality of arm keypoints; and
determining whether the driving user has an abnormal driving behavior according to the arm bending angle;
wherein the instruction is executed by the at least one processor to cause the at least one processor to perform determining the plurality of arm keypoints of the arm contained in the original image of the driving user by:
recognizing a human face region in the original image of the driving user;
expanding the human face region of the driving user to obtain a candidate region, wherein the candidate region comprises an arm region;
clipping the original image according to the candidate region to obtain a target image; and
determining the plurality of arm keypoints of the arm contained in the target image.

10. The electronic device of claim 9, wherein the plurality of arm keypoints comprise a hand keypoint, a shoulder keypoint and an elbow keypoint; and
wherein the instruction is executed by the at least one processor to cause the at least one processor to perform determining the arm bending angle of the driving user according to the plurality of arm keypoints by:
determining a forearm segment between the hand keypoint and the elbow keypoint and an upper arm segment between the elbow keypoint and the shoulder keypoint; and
using an angle between the forearm segment and the upper arm segment as the arm bending angle.

11. The electronic device of claim 10, wherein in response to the original image comprising at least two human face images, the instruction is executed by the at least one processor to cause the at least one processor to further perform:
removing abnormal keypoints of a non-driving user from the plurality of arm keypoints.

12. The electronic device of claim 11, wherein the instruction is executed by the at least one processor to cause the at least one processor to perform removing the abnormal keypoints of the non-driving user from the plurality of arm keypoints by:
determining the abnormal keypoints of the non-driving user according to a length of at least one of the forearm segment or the upper arm segment associated with each arm; and
removing the abnormal keypoints from the plurality of arm keypoints.

13. The electronic device of claim 11, wherein the instruction is executed by the at least one processor to cause the at least one processor to perform removing the abnormal keypoints of the non-driving user from the plurality of arm keypoints by:
determining the abnormal keypoints of the non-driving user according to a distance between arm keypoints of each arm and a human face image of the driving user; and
removing the abnormal keypoints from the plurality of arm keypoints.

14. The electronic device of claim 9, wherein in response to recognizing at least two human face regions in the original image, the instruction is executed by the at least one processor to cause the at least one processor to perform:
determining, a larger human face region of the at least two human face regions to be the human face region of the driving user.

15. The electronic device of claim 9, wherein the instruction is executed by the at least one processor to cause the at least one processor to further perform:
determining a line-of-sight angle of the driving user in the original image; and
determining whether the driving user has the abnormal driving behavior according to the line-of-sight angle.

16. The electronic device of claim 15, wherein the instruction is executed by the at least one processor to cause the at least one processor to perform determining the line-of-sight angle of the driving user in the original image by:
determining a pupil category of the driving user in the original image, wherein the pupil category comprises at least one of a left part of an eye, a right part of an eye, an upper part of an eye, a lower part of an eye, a middle part of an eye or a closed eye; and
determining the line-of-sight angle of the driving user according to the pupil category.

17. A vehicle, comprising the electronic device of claim 9.

18. A non-transitory computer-readable storage medium storing a computer instruction, wherein the computer instruction is configured to cause a computer to perform the following steps:
determining a plurality of arm keypoints of an arm contained in an original image of a driving user;
determining an arm bending angle of the driving user according to the plurality of arm keypoints; and
determining whether the driving user has an abnormal driving behavior according to the arm bending angle;
wherein determining the plurality of arm keypoints of the arm contained in the original image of the driving user comprises:
recognizing a human face region in the original image of the driving user;
expanding the human face region of the driving user to obtain a candidate region, wherein the candidate region comprises an arm region;

clipping the original image according to the candidate region to obtain a target image; and determining the plurality of arm keypoints of the arm contained in the target image.

* * * * *